United States Patent

[11] 3,603,736

[72] Inventor Terence David Morroll
Beeston, England
[21] Appl. No. 855,524
[22] Filed Sept. 5, 1969
[45] Patented Sept. 7, 1971
[73] Assignee Ericsson Telephones Limited
Ilford, England
[32] Priority Sept. 24, 1968
[33] Great Britain
[31] 45406/68

[54] TELECOMMUNICATION EXCHANGES
4 Claims, 6 Drawing Figs.

[52] U.S. Cl. .......... 179/15 BF
[51] Int. Cl. .......... H04j 3/14
[50] Field of Search .......... 179/15 BF

[56] References Cited

UNITED STATES PATENTS

| | | | |
|---|---|---|---|
| 3,042,752 | 7/1962 | Fulmer | 179/15 BF |
| 3,161,732 | 12/1964 | Martin | 179/15 BF X |
| 3,457,373 | 7/1969 | Van Duuren | 179/15 BF |

*Primary Examiner*—Ralph D. Blakeslee
*Attorney*—Blum, Moscovitz, Friedman & Kaplan

ABSTRACT: A telecommunication exchange having groups of highways carrying pulse code modulated signals and, for each group, a working superhighway shared by signals carried on the highways of the group, which exchange includes a working spare superhighway to which signals are applied simultaneously with their application to the working superhighways and fault detection means responsive to a fault on a working superhighway or on the working spare superhighway to suppress transmission over the faulty superhighway.

Figure 1:
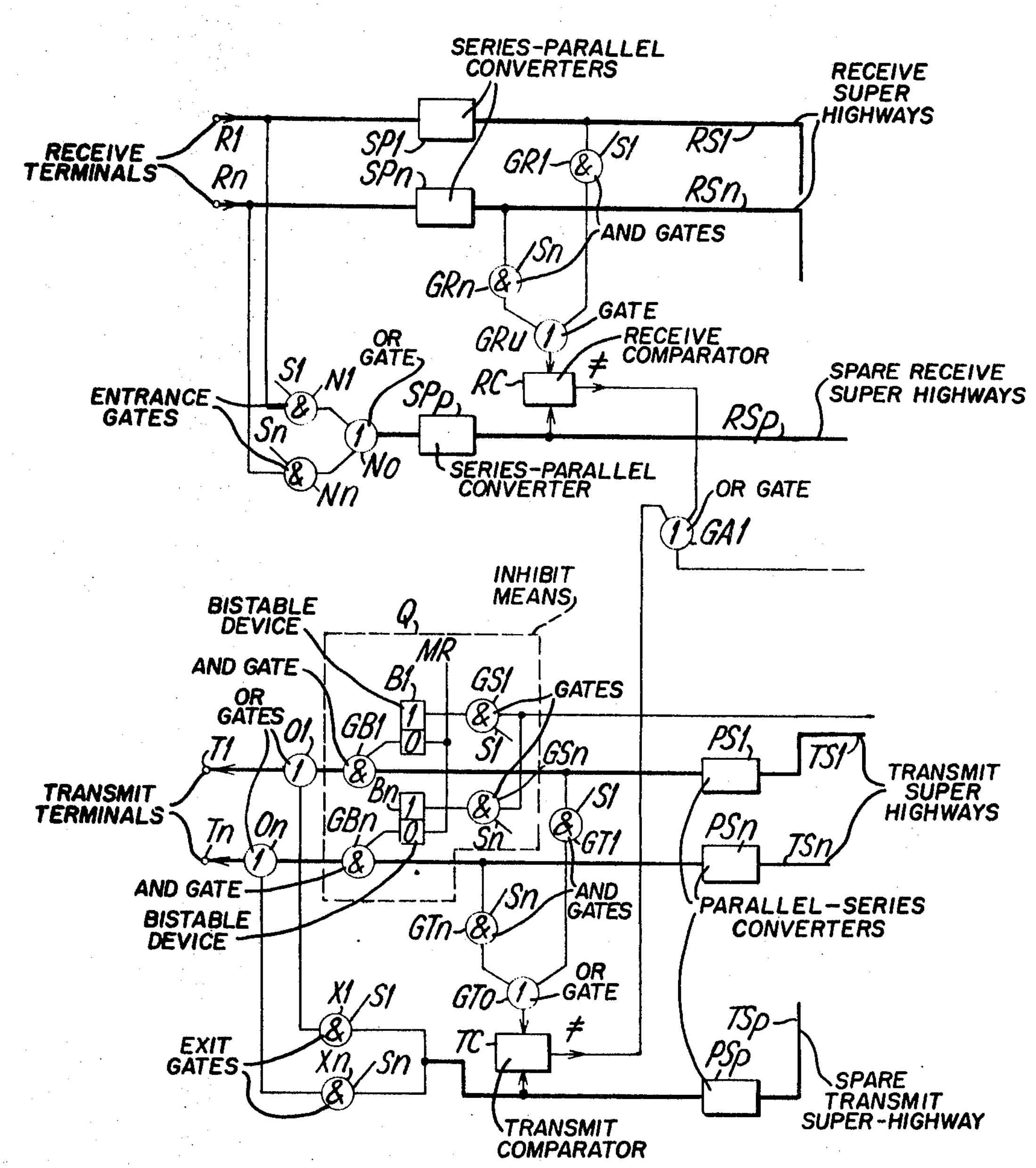
Figure 2:
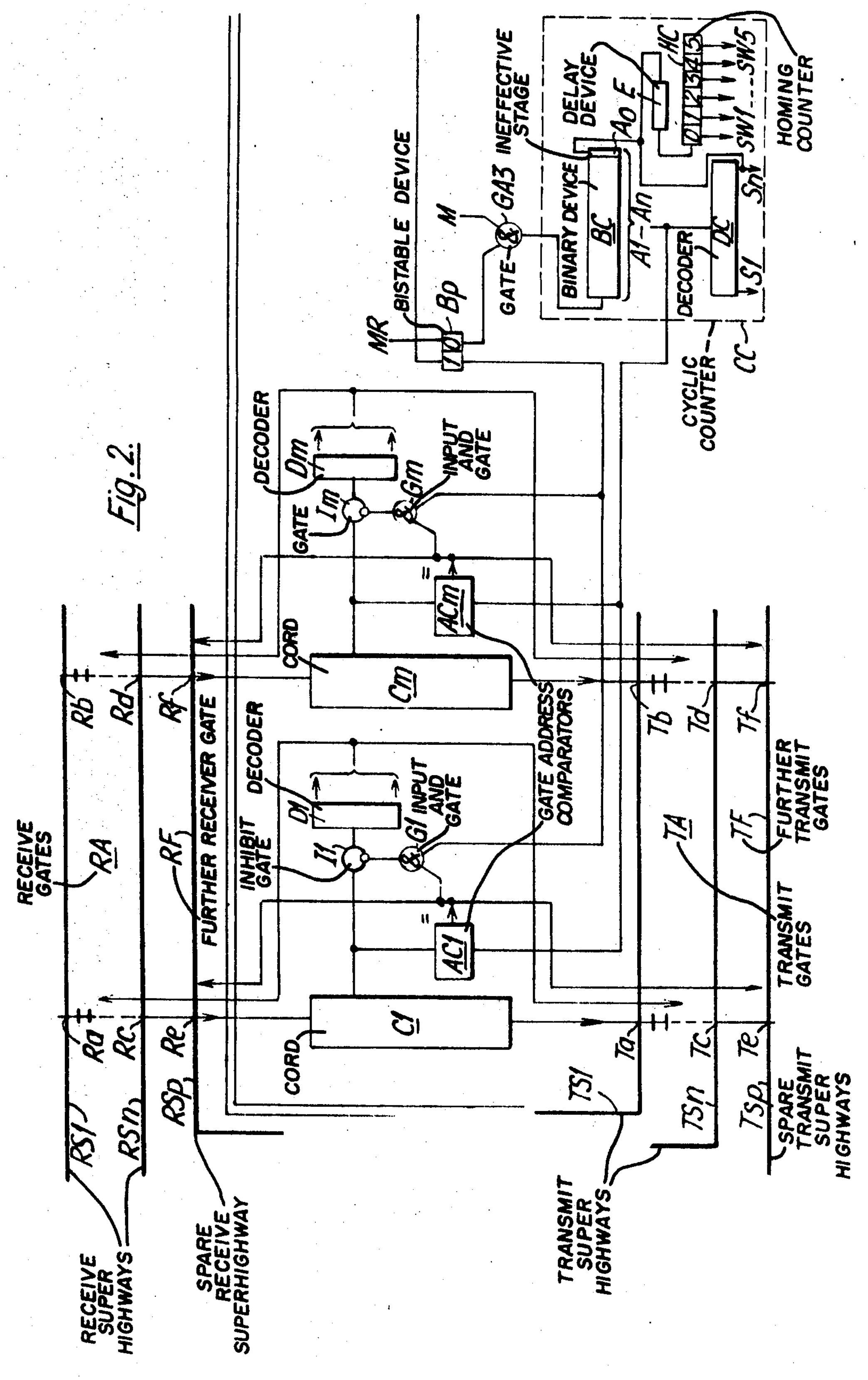
Figure 3:
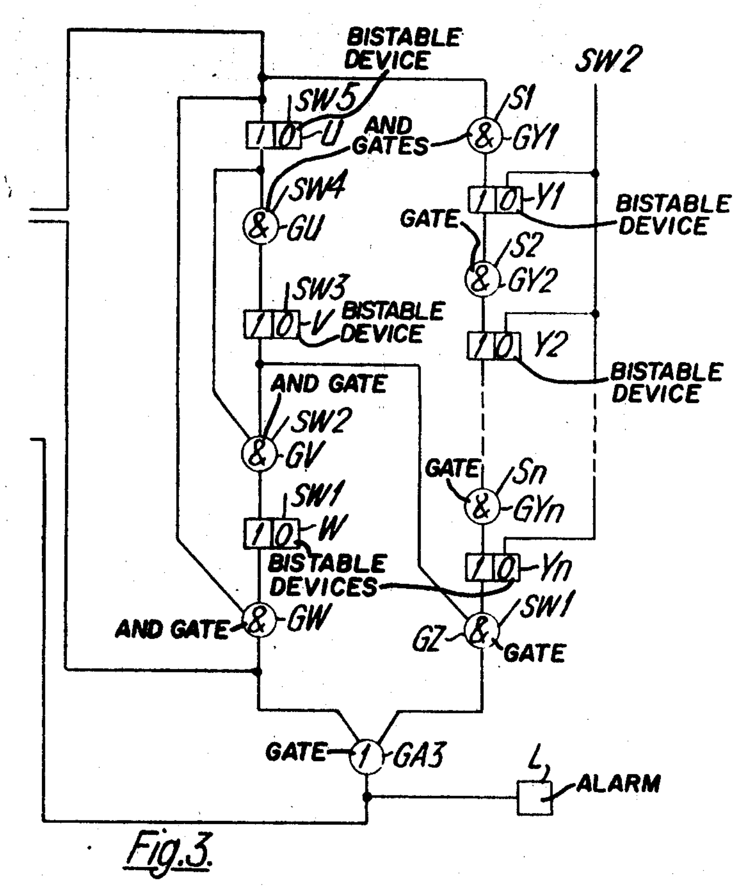

Fig. 1 Fig. 2 Fig 3

TELECOMMUNICATION EXCHANGES

This invention relates to telecommunication exchanges which serve to connect a call over two pulse code modulation systems in tandem, and is particularly concerned with the problem of securing continuity of service in the event of faults at exchanges employing superhighways.

Exchanges are known in which highways carrying pulse code modulation signals in serial form are connected to superhighways which carry the signals in parallel form. A call through such an exchange is connected by means of temporary stores known as "cords," which are assigned to calls as required and which are used to transfer signals received on a receive superhighway to a transmit superhighway, parallel-form signals on a transmit superhighway being subsequently converted into serial-form signals and applied to transmit highways. Connection between the cords and the superhighways is effected by means of an array of receive gates and an array of transmit gates. To permit signals to be passed in both directions, it is customary to provide a transmit superhighway corresponding to each receive superhighway, involving a transmit gate corresponding to each receive gate, to operate corresponding receive and transit gates throughout a time slot in use on corresponding superhighways, and to use half the time slot for signals in one direction and half for signals in the opposite direction.

A superhighway carries a high concentration of traffic, and a fault on a superhighway or on a gate to which it is connected affects a large number of calls. For instance, if eight 12-channel highways are connected to one superhighway, as many as 96 calls may be effected by a single fault.

According to the invention, there is provided a telecommunication exchange having a number of working receive superhighways and a spare receive superhighway, a working transmit superhighway corresponding to each working receive superhighway and a spare transmit superhighway, cords assignable to calls routed through the exchange, a working array of receive gates connecting the working receive superhighways to the cords, and further receive gates connecting the spare receive superhighway to the cords, a working array of transmit gates connecting the cords to the working transmit superhighways, and further transmit gates connecting the cords to the spare transmit superhighway, which exchange also has association means by way of which signals deliverable to a cord from a working receive superhighway are also deliverable at the same time to the cord from the spare receive superhighway through one of said further receive gates, the further transmit gates being operable so that signals deliverable from a cord to a working transmit superhighway are also deliverable at the same time to the spare transmit superhighway, and security means operable in the event of a fault on a receive superhighway to prevent delivery of signals from the faulty receive superhighway to a cord, and in the event of a fault on a transmit superhighway to prevent delivery of signals from the cords to the faulty transmit superhighway, delivery of signals over the relevant spare superhighway being maintained uninterrupted by the operation of the security means.

Figure 4:
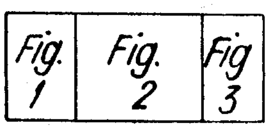

The invention will now be described with reference to the accompanying drawings in which:

FIGS. 1, 2 and 3, when arrange as shown in FIG. 4, show schematically the relevant parts of a telecommunication exchange at which the invention is employed.

Figures 5A, 5B:
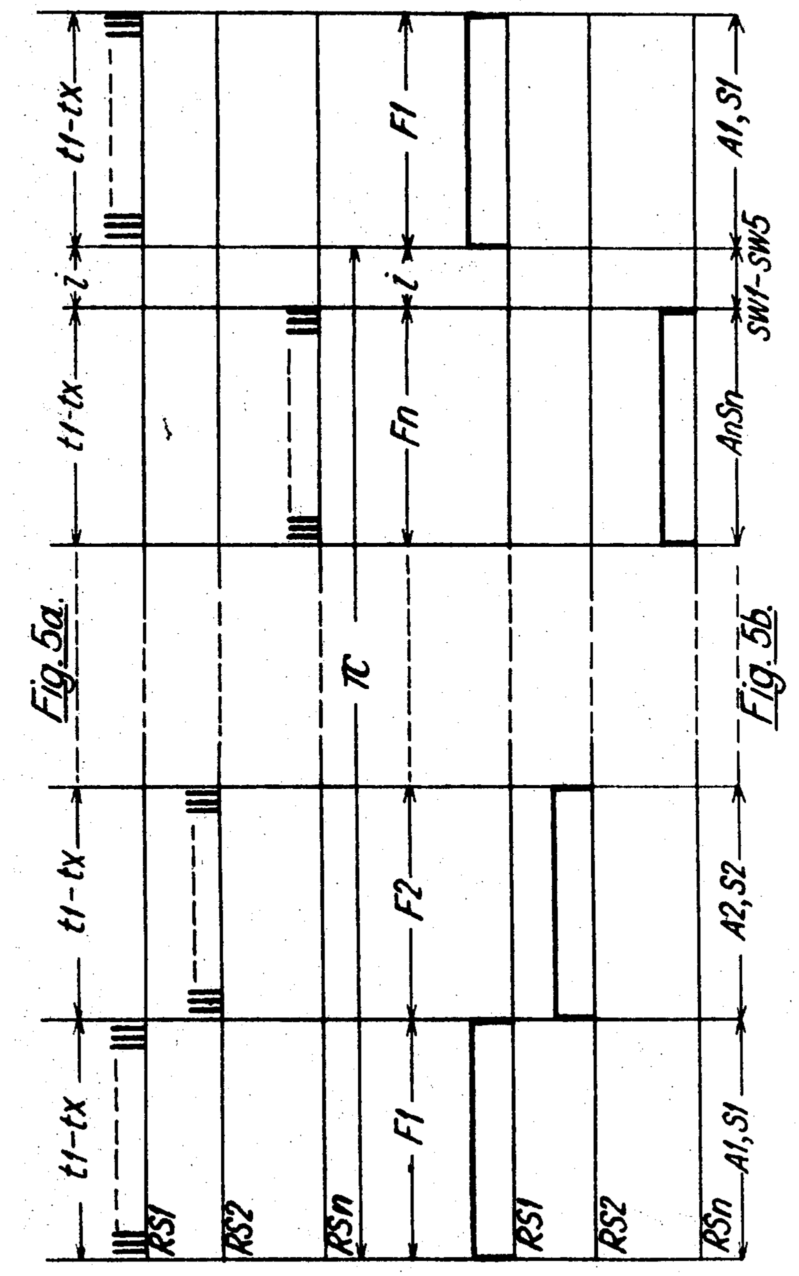

FIG. 5*a* is a time chart showing pulses used in the exchange, and

FIG. 5*b* shows pulses delivered by a counting device in synchronism with the pulses of Fig. 5*a*.

The general arrangement of the exchange follows accepted practice in that serial-form signals received at any of a number of receive terminals R1....R*n* (of which, for reasons of simplicity, only two are shown in FIG. 1) are converted into parallel form by series-parallel converters SP1....SP*n* and are carried by working receive superhighways RSi....RS*n*, to a coordinate array of receive gates RA (FIG. 2) as indicated by the four reference points R*a*, R*b*, R*c*, R*d*. The array RA of receive gates gives access from the receive superhighways RS1....RS*n* to cords C, of which only the first C1 and the last C*m* are shown. The number *m* of cords is any number adequate for the traffic carried by the exchange. The cords C are connected to transmit gates as indicated by the four references points T*a*, T*b*, T*c*, T*d*, which together form a coordinate array TA of transmit gates, each transmit gate corresponding to a receive gate in the receive array RA. The transmit array TA gives access from the cords C to a number of working transmit superhighways TS1....RS*n*, each of which corresponds to one of the working receive superhighways RS1....RS*n*. Parallel-form signals on the transmit superhighways TS1....TS*n* are converted into serial form by parallel-series converters PS1....PS*n* and are delivered at transmit terminals T1....T*n*.

The superhighways are operated in a repetitive time cycle TC (FIG. 5*a*). The time cycle contains a number of equal periods or frames F1....F*n*. There is one frame for each working receive superhighway RS1....RS*n*, and a frame is used to operate both a receive superhighway and the transmit superhighway corresponding thereto. Each frame includes a number of time slots *t*1....*tx* for carrying signals relating to individual calls. Commonly, but not necessarily, the number of *x* time slots *t* in a frame is 96. The time cycle TC includes an idle period *i*, as will be discussed later. A cord C stores signals from the time slot in which they are received over a receive superhighway until the time slot in which they are required for transmission over a transmit superhighway, the transmit superhighway being one that does not correspond to the receive superhighway over which the signals were received. For this purpose a cord has message stores (not shown) equal in number to the number *x* of time slots in a frame. To allow any message store to be connected to any superhighway, each gate array RA, TA contains *nx* gates in respect of each cord C, *n* being the number of receive superhighways and *x* the number of time slots, i.e. the number of message stores. (For simplicity, the gates are not shown individually in FIG. 2). As explained before, gate address stores (not shown) are provided as well as message stores. For each call, two pairs of superhighways are employed, each pair comprising a working receive superhighway and the working transmit superhighway corresponding thereto. One pair gives access to and from the point of origin of a call; the other pair gives access to and from the destination of the call. It is customary to use an odd-numbered time slot for the former pair of superhighways, and an even-numbered time slot for the latter pair. A message store stores signals for one direction of speech during a part of the time cycle TC, and signals for the opposite direction during the remainder of the time cycle. To permit a message store to be connected to the appropriate superhighways in the requisite time slots, each message store (not shown) is provided with a pair of gate address stores (not shown). When a cord is assigned to a call, a gate address is written in to each gate address store, each address identifying a receive gate and corresponding transmit gate by which the message store can be connected to one of the two pairs of superhighways employed. The message store is read out twice in a time cycle, i.e. by both the odd and even slots employed; each gate address store, however, is read out once only in the time cycle, i.e. one store by the odd time slot and the other by the even time slot. Read out of a gate address causes the addressed receive and transmit gates to be primed for the duration of the relevant time slot. In the first half of the time slot, the message store is read out and its contents delivered to a transmit superhighway (the priming of the receive gate being redundant). In the second half of the time slot, signals received over the receive superhighway to which the transmit superhighway corresponds are written into the emptied message store (the priming of the transmit gate being redundant).

Of the *nx* gates by which a cord may be connected to a working receive superhighway, each gate is identifiable by two coordinate numbers, one in the range 1....*n* and the other in the range 1....*x*. The number in the range 1....*x*, i.e. the number of the time slot in use for the call, does not need to be recorded because the message store appropriate to the time slot has already been selected. Hence a gate address comprises merely a number in the range 1....*n*, i.e. the number of the working receive superhighway in use. Conveniently, but not necessarily, this number is stored in binary code.

In accordance with the invention, a spare receive superhighway RS*p* is connected to the cords C1....C*m* by further receive gates RF as indicated by the two reference points R*y*, R*z*. Further transmit gates TF, indicated by the two reference points T*y*, T*z*, connect the cords to a spare transmit superhighway TS*p*. In respect of each cord there are *x* further receive and *x* further transmit gates, *x* being the number of time slots in a frame. The spare receive superhighway RS*p* has a series-parallel converter SP*p*, and the spare transmit superhighway TS*p* has a parallel-series converter PS*p*. Access to the spare receive superhighway RS*p* is by way of entrance gates N1....N*n*. Each entrance gate, e.g. N1, comprises a two-input AND gate having one input connected to one of the receive terminals, e.g. R1. Selection pulses applied to the other inputs serve to prime the gates as will be considered later. The outputs of the gates N1....N*n* are connected to the inputs of an OR gate N*o*, whose output is connected to the spare receive superhighway RS*p*. At its output end, the spare transmit superhighway TS*p* is connected to a number of exit gates X1....X*n*. Each exit gate, e.g. X1, comprises a two-input AND gate which can be primed by a selection pulse, as will be considered later. There is one exit gate corresponding to each working transmit superhighway TS....TS*n*. The outputs from an exit gate and signals from the working transmit superhighway to which it corresponds are connected as inputs to the relevant one of a number of OR gates O1....O*n* whose outputs are connected respectively to the terminals T1....T*n*.

Each cord, e.g. C1, has a gate address comparator, e.g. AC1. As already explained, each time a signal is read from a message store in a cord, the address of the gate required is read from the appropriate gate address store. In accordance with the invention, each gate address that is read out is applied to the gate address comparator, e.g. AC1, relating to the cord concerned. An address that is read out is applied not only to a comparator, e.g. AC1, but also by a normally inoperative inhibit gate, e.g. I1, to a decoder, e.g. D1. A decoder has a lead in respect of each working receive superhighway, and a corresponding lead in respect of each corresponding transmit superhighway. An address indicates a working receive superhighway and its corresponding transmit superhighway. A decoder decodes an address into a single signal applied to the lead appropriate to the receive superhighway identified by the address, and a single signal on the corresponding lead in respect of the corresponding transmit superhighway. On each of the superhighways concerned, these single signals prime all the *x* gates by which the superhighways can be connected to the cord. Thus whenever a stored signal is read from a message store, the requisite gate is primed and the desired connection is effected. The priming of the remaining *x*—1 gates on each superhighway is ineffective.

A cyclic counting device CC (FIG. 2) is operable by pulses identifying the frames F1....F*n* which are applied as a monitor signal M to an AND gate GA2. The gate GA2 is normally primed by the output of a bistable device B*n*. The counting device counts the number of frames in each time cycle, and during each frame delivers two output signals identifying the working receive superhighway and the corresponding transmit superhighway to which the frame relates. The first output signal, referenced A (FIGS. 2, 5*b*) followed by the number of the relevant receive superhighway, is delivered in a code which is compatible for comparison purposes with the code used for storing a gate address in a gate address store. Conveniently, both codes are binary code, and a binary counter BC is used to deliver the coded signals A1....A*n*. The second output signal, referenced S followed by the number of the relevant receive superhighway, is delivered as a single signal on a lead individual to the superhighway. Conveniently, the single signals S1....S*n* are delivered by a decoder DC driven by the binary counter BC. The two output signals, e.g. A1, S1, coincide in time. The binary counter BC also has an ineffective stage A*o*, as will be considered later. Leads carrying the coded signals A1....A*n* are multipled over the gate address comparators AC1....AC*m* associated with the cords C1....C*m*. The single signals S1....S*n* will be referred to as selection pulses. As will be explained later, they are used to prime various AND gates. The counting device CC is also arranged to deliver a number, e.g. 5, of switching pulses *sw*1....*sw*5 during the idle period *i* of each time cycle (see FIG. 5*b*). This may be achieved by means of a homing counter HC (FIG. 2) having a home stage and a number of effective stages equal to the number of switching pulses required. A delay device E, actuated by the selection of pulse S*n* causes the homing counter HC to drive through one cycle, after imposing a delay sufficient to ensure that driving does not begin until the idle period *i* has started. The delay device E also sets the binary counter BC to its ineffective state A*o*.

The gate address comparators, e.g. AC1, are arranged to deliver an output signal in the event of parity between an address read out from the relevant cord, e.g. C1, and an address delivered by the counting device CC. This output signal is used to prime the *x* further receive gates by which the cord, e.g. C1, can be connected to the spare receive superhighway RS*p*, and also the *x* further transmit gates by which the cord can be connected to the spare transmit superhighway TS*p*. The priming of the remaining *x*—1 gates in each spare superhighway is ineffective. If an address comparator, e.g. AC1, has operated, the address read out from the cord will also normally have operated the relevant decoder, e.g. D1. As previously explained, this causes the priming of the gates appropriate to connect the relevant message store in the cord, e.g. C1, to the working receive and corresponding transmit superhighways in use for the call. Thus in normal operation a cord is connected to the appropriate working receive and transmit superhighways and at the same time to the spare receive and transmit superhighways. As will be considered later, the output signal from a gate address comparator, e.g. AC1, is also applied to a two input AND gate, e.g. G1.

The selection pulses S1....S*n* are applied as inputs to the respective entrance gates N1....N*n* (FIG. 1) and exit gates X1....XX*n*. The selection pulses S1....S*n* and their simultaneous coded equivalent signals A1....A*n* serve to determine which working receive and corresponding transmit superhighways are at any given time associated with—i.e. connected in parallel with the spare working and receive superhighways. With such parallel connections set up at each time slot of each call in progress, no delay is experienced in establishing an alternative connection should one of the connections become faulty. The only action required is to suppress the signals on the faulty connection. With exchanges hitherto in service, delay is experienced when a fault occurs on account of the time taken to establish an alternative connection, and this delay frequently results in loss or mutilation of signals.

To determine when a fault arises, a receive comparator RC (FIG. 1) and a transmit comparator TC are provided. The comparators RC, TC are selectively connectable respectively to the working receive and transmit superhighways RS1....RS*n*, TS....TS*n* by selection pulses S1....S*n* applied to AND gates GR1....GR*n*, GT1....GT*n*. The outputs of these gates are delivered to OR gates GR*o*, GT*o* and thence to the respective comparators. The receive and transmit comparators RC, TC are also connected respectively to the spare receive and spare transmit superhighways RS*p*, TS*p*. The comparators are placed on the output side of the series-parallel converters SP1....SP*p* and the parallel-series converters PS1....PS*p*, so that the comparisons made by the comparators afford a check on the working of the converters as well as checking for a fault affecting the functioning of the superhighways themselves. Selection pulses S1....S*n* are applied to the gates GR1....GR*n*, GT1....GT*n* and to the exit gates X1....X$n$ in synchronism with their application to the entrance gates N1....N$n$. Hence whenever a working receive superhighway is associated with the spare receive superhighway, the corresponding working transmit superhighway is associated with the spare transmit superhighway, and the receive and transmit comparators are effectively connected across the respective associated superhighways. The comparators RC, TC are arranged to deliver an output or disparity signal in the event of disparity between the signals compared. The disparity signals are passed via an OR gate GA1 to a fault analysis circuit (FIG. 3) in order to determine whether the fault causing the disparity has arisen on a working or a spare superhighway.

A disparity signal delivered to the fault analysis circuit (FIG. 3) operates a bistable device U which was set in its inoperative state by the switching pulse *sw*5 of the preceding time cycle, The disparity signal also primes two AND gates GW, GY1 The operation of the bistable device U primes a two input AND gate GU and partly primes a three input AND gate GV. At the end of the cycle in which the disparity signal was delivered, the switching pulse *sw*4 opens the gate GU and operates a bistable device V, priming a gate GZ and partly priming the gate GV. Pulse *sw*5 restores the bistable device U and removes part of the priming from gate GV.

If the fault causing the disparity signal is on a working superhighway, the disparity signal does not recur until the same frame of the next time cycle. When the disparity signal reappears, the bistable device U is operated as before. On this occasion however, with the bistable device U already operated, the gate GV is fully primed, and at the end of the cycle responds to pulse *sw*2 to operate the bistable device W, priming gate GW. Pulses *sw*3, *sw*5 restore bistable devices V, U, In the next time cycle again, the gate GW responds to the disparity signal to operate inhibit means Q (FIG. 1) and to open gate GA3. The inhibit means Q are any suitable means which operate to prevent delivery of signals from a faulty transmit superhighway or from a transmit superhighway which corresponds to a faulty receive superhighway. Conveniently the inhibit means comprise in respect of each working transmit superhighway a bistable device e.g. B1 which normally primes an AND gate e.g. GB1 to which signals delivered by the superhighway e.g. TS1 are also applied. The bistable devices e.g. B1 are selectively responsive to the output of the gate e.g. GS1 to which the selection pulses e.g. S1 are applied. If the fault is on a working superhighway—either receive or transmit— e.g. RS1 or TS1, the stopping of the counter CC prolongs indefinitely the relevant coded signal e.g. A1 delivered by the binary counter BC and the corresponding selection pulse e.g. S1 delivered by the decoder DC. The prolonging of the selection pulse S1 maintains the association of the faulty superhighway and the spare. Also with gate GW (FIG. 3) open, gate GS1 (FIG. 1) opens operating the bistable device B1, thereby disabling gate GB1 and preventing delivery of faulty signals. The prolonging of the coded signal A1 means that all the gate address comparators AC1....AC$m$ are marked with the number of the faulty superhighway. When a gate address for a gate on the faulty superhighway is read from a cord, e.g. C$m$, the relevant address comparator i.e. AC$m$ delivers an output signal. As previously described, this signal primes the further receive and transmit gates appropriate to the cord C$m$. However, if the fault causing the disparity signal is on the spare superhighway, the disparity signal is regenerated during each frame. At the first appearance of the disparity signal gate GZ is primed because the bistable device V remains operated. In the ensuing cycle, the reappearance of the disparity signal coincides with selection pulse S1, opening gate GY1 and operating a bistable device Y1. There is a gate GY and a bistable device Y for each working receive and corresponding transmit superhighway, and these now operate successively until at the end of the cycle. Switching pulse *sw*1 then opens gates GZ and GA3.

The opening of gate GA3 operates an alarm L and also operates a bistable device B$p$ (FIG. 2). With the bistable device B$p$ operated, the gates G....G$m$ are primed. The gate GA3 is disabled and the counter CC is stopped with the bistable device B$p$ operated, gate G$m$ opens and inhibits gate I$m$, thereby disconnecting the decoder D$m$ and preventing the priming of the gates connecting the cord C$m$ to the faulty superhighway.

If the fault is on either of the spare superhighways RS$h$ or TS$h$, the counter CC is stopped during the idle period of the time cycle. With binary counter BC set to its ineffective stage A$o$ by the output of the delay device E, no coded signal is applied to the gate address comparators AC1....AC$m$. Hence the delivery of an output signal is prevented and the priming of the gates that would connect a cord e.g. C$m$ to the spare superhighways is prevented.

If it is desired to increase the persistance time of a fault before action is taken, the number of bistable devices in the chain U, V, W (FIG. 3) may be increased, with a corresponding increase in the number of switching pulses *sw*1–*sw*5.

When a fault has been cleared, normal conditions are restored by applying a manual restore signal MR to the bistable devices B1....B$Bn$ (FIG. 1) and B$p$ (FIG. 2).

As is well known to readers skilled in the arts of electronics and telecommunications, the various components mentioned herein e.g. gates, comparators, bistable devices, counters, cords and converters may have many different constructions. It is within the compass of such a reader to choose constructions suitable for his particular purposes.

What we claim is:

1. A telecommunication exchange having a number of working receive superhighways and a spare receive superhighway, a working transmit superhighway corresponding to each working receive superhighway and a spare transmit superhighway, cords assignable to calls routed through the exchange, a working array of receive gates connecting the working receive superhighways to the cords, and further receive gates connecting the spare receive superhighway to the cords, a working array of transmit gates connecting the cords to the working transmit superhighways, and further transmit gates connecting the cords to the spare transmit superhighway, characterized by association means by way of which signals deliverable to a cord from a working receive superhighway are also deliverable at the same time to the cord from the spare receive superhighway through one of said further receive gates, the further transmit gates being operable so that signals deliverable from a cord to a working transmit superhighway are also deliverable at the same time to the spare transmit superhighway, and security means operable in the event of a fault on a receive superhighway to prevent delivery of signals from the faulty receive superhighway to a cord, and in the event of a fault on a transmit superhighway to prevent delivery of signals from the cords to the faulty transmit superhighway, delivery of signals over the relevant spare superhighway being maintained uninterrupted by the operation of the security means.

2. An exchange as claimed in claim 1 in which a cord assigned to a call is capable of delivering an address signal identifying a working receive and the corresponding transmit superhighways used for the call to which the cord is assigned, the address signal priming a receive gate and a transmit gate appropriate to connect the cord to the said selected and corresponding superhighways; characterized in that the association means comprise a cyclic counting device operable to deliver a cycle of selection and switching pulses and coded pulses coincident with said selection pulses the selection pulses identifying each working receive superhighway in turn as well as a working transmit superhighway corresponding to a selected receive superhighway, entrance and exit gates controlled by said selection pulses whereby signals applied to a selected working receive superhighway are also applied to the spare receive superhighway and signals delivered by the working transmit superhighway corresponding to the selected receive superhighway are also delivered by the spare transmit superhighway, and a gate address comparator individual to each cord for comparing an address signal read from the cord to which the comparator relates with coded pulses delivered by the counting device, the comparator operating in the event of parity to prime the further receive and further transmit gates connecting the cord to the spare superhighways.

3. An exchange as claimed in claim 2 characterized by receive and transmit comparators operable in dependence on said selection pulses to compare signals on a working superhighway with signals on a spare superhighway while the superhighways are associated with each other by the association means, a comparator generating a disparity signal if a comparison reveals a disparity; inhibit means individual to each working transmit superhighway selectively operable to inhibit delivery of signals by the said superhighways; and a fault analysis circuit operable in response to a disparity signal generated during the association of a working superhighway with a spare superhighway if a disparity signal has also been generated during each of a succession of preceding associations of said working and spare superhighways, the circuit operating at the time a disparity signal is applied thereto firstly to suspend the operation of the cyclic counting device and secondly to operate the inhibit means in respect of the working superhighway associated with the spare superhighway at the time the disparity signal was generated,

4. An exchange as claimed in claim 3 characterized in that the fault analysis circuit is responsive to a sequence of disparity signals generated during association of a spare superhighway with a sequence of working superhighways, the circuit operating after such response on the application of a switching pulse thereto to suspend the operation of the cyclic counting device.